UNITED STATES PATENT OFFICE.

ELIZABETH BELLINGER, OF MOHAWK, NEW YORK.

IMPROVEMENT IN COMPOSITION FUEL.

Specification forming part of Letters Patent No. 18,729, dated December 1, 1857.

*To all whom it may concern:*

Be it known that I, ELIZABETH BELLINGER, of Mohawk, in the county of Herkimer and State of New York, have invented a new and useful Inflammable Composition for Kindling Fires; and I do hereby declare that the following is a full, clear, and exact description of the same.

To make my composition I take of kauri gum, rosin, and alcohol in the following proportions, by weight, viz: kauri gum, one part; rosin, five parts; alcohol, one part. I place these ingredients together in a suitable vessel and allow them to remain therein, subjected to an ordinary atmospheric temperature, or to a gentle heat over a fire, long enough for the kauri gum and rosin to be dissolved, and I then add wood-sawdust in such quantity that when stirred up and well mixed the whole forms a paste of as great a degree of consistency as can be conveniently molded by pressure into slabs, cakes, blocks, or lumps of any convenient size, and after molding it in suitable molds of wood, metal, or other suitable material, I leave the cakes, slabs, blocks, or lumps to dry in the atmosphere.

When dried hard the composition is fit for use, and ignites readily on the application to it of a lighted match, and a small piece of it, sufficient to ignite an ordinary wood or coal fire, will burn for from ten to fifteen minutes. The composition is a more convenient, effective, economical fire-kindler than any substance or composition known to me.

The kauri gum constitutes a very important part of this composition on account of its igniting very readily and burning for a long time with a very large and intense flame. The rosin is employed as a cheaper inflammable substance than the kauri gum to assist the latter in igniting the sawdust. The sawdust ignited from the kauri gum and rosin being a slower-burning substance serves as a heat-reserving medium to effect the perfect ignition of the wood, coal, or other fuel. The alcohol is used only as a solvent for the kauri gum and rosin to enable them to be combined or incorporated with the sawdust.

I do not claim the exclusive use of sawdust, rosin, tar, &c., in artificial fuels or fire-kindling fuels, for I am aware that they have been used before in various artificial fuels and fire-lighting compounds; but to the best of my knowledge and belief no fire-kindling compound has ever been made in which gum-kauri has been used in connection with other hydrocarbons to give duration and intensity to the flame. By the omission of gum-kauri my compound is left almost worthless. By its addition the mass is rendered highly inflammable and the heat is prolonged and intensified, a more perfect combustion being produced.

The additional expense of the gum-kauri is quite small, and I am enabled by its use to make a kindling compound which is equal, if not superior, in point of inflammability to any others at a cheaper price. One pound of gum-kauri produces all the effect that is claimed for a similar quantity of camphor, as used in B. Reilly's patent, November 6, 1855.

The advantage of my improvement, so far as economy is concerned, is almost as three to one in my favor, the market price of camphor being forty-two and one-half cents per pound and gum-kauri only fifteen cents per pound.

I do not confine myself to the precise proportions of the several ingredients herein specified; but

What I claim as my invention, and desire to secure by Letters Patent, is—

The inflammable composition formed by the union of kauri gum, rosin, and sawdust in suitable proportions to give it the character herein specified.

ELIZABETH BELLINGER.

Witnesses:
JOHN BELLINGER,
JONAS SCHALL.